July 2, 1935. B. B. KENDIG 2,007,110
MACHINE FOR LETTERING HAT BANDS AND THE LIKE
Filed Dec. 28, 1929 6 Sheets-Sheet 1
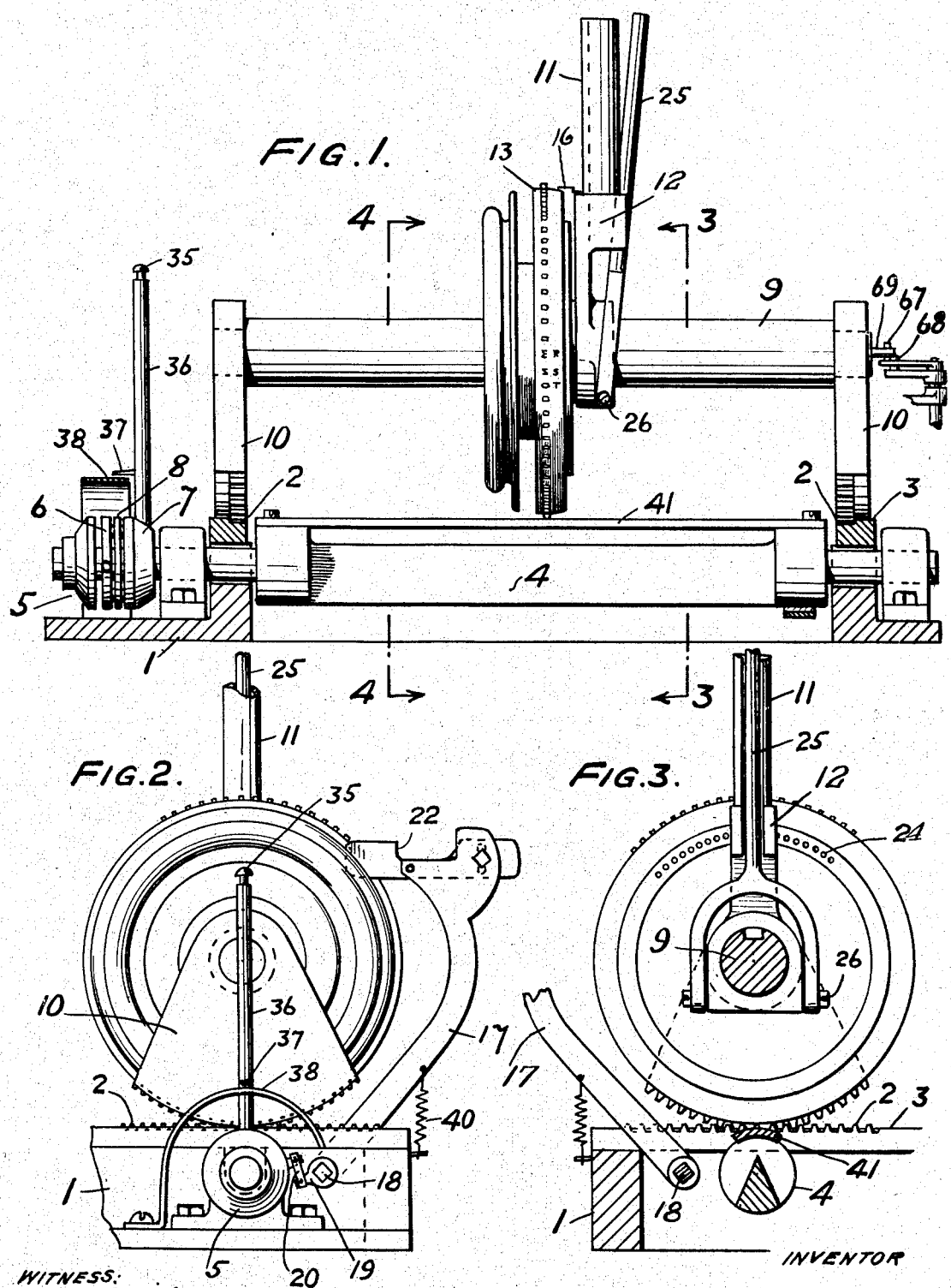
WITNESS:
INVENTOR
Benton B. Kendig
BY
Augustus B Stoughton
ATTORNEY.

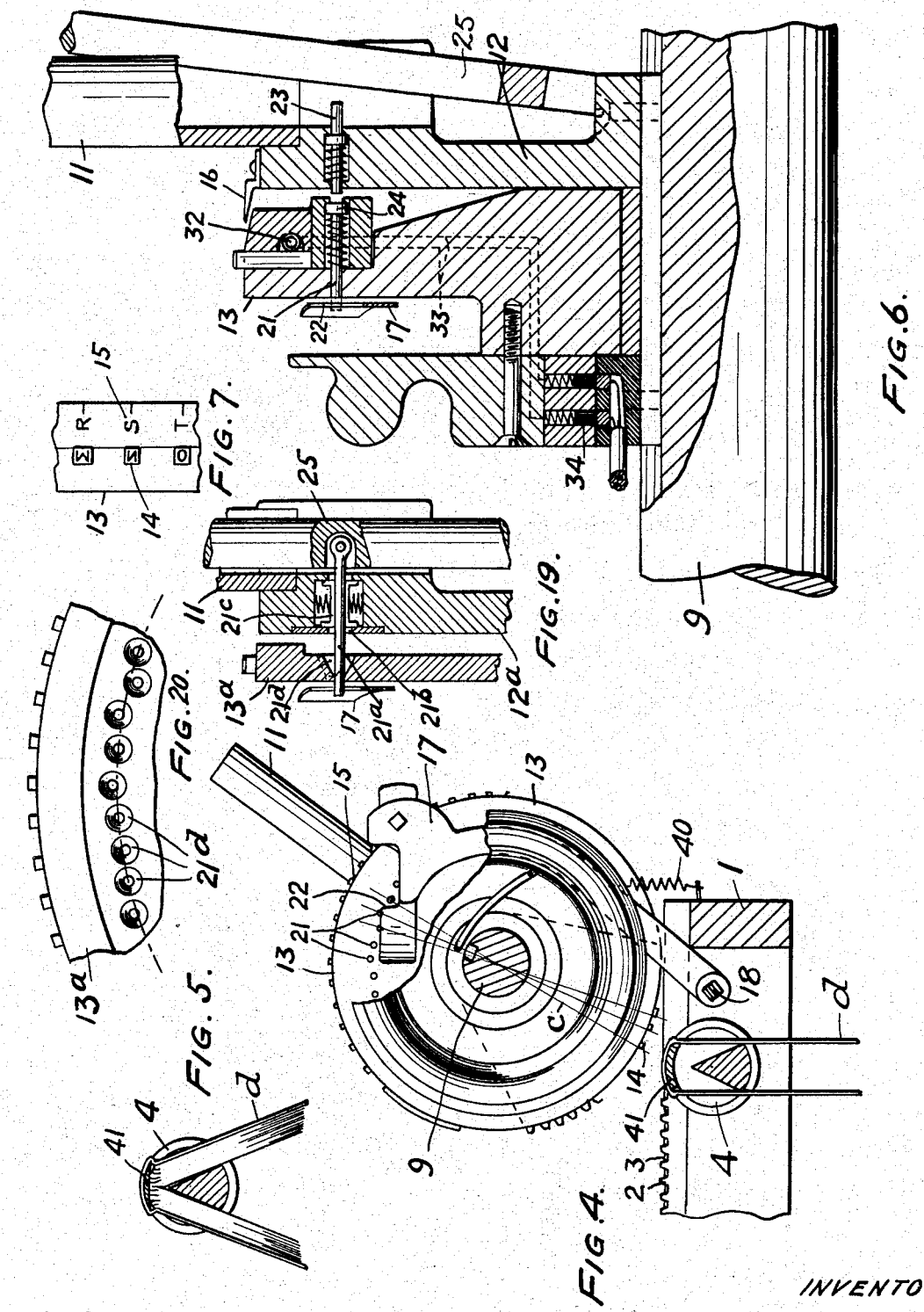

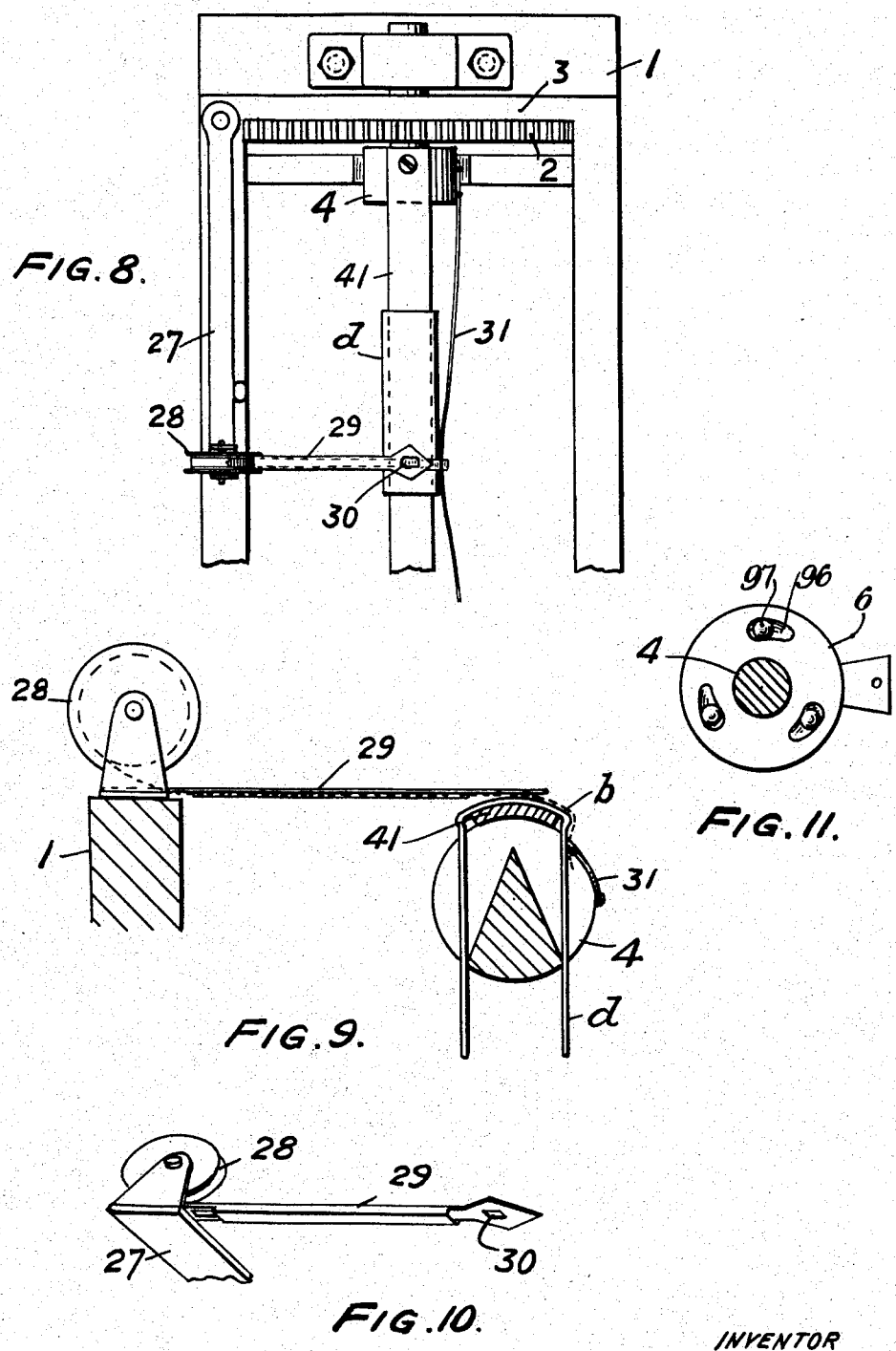

July 2, 1935.　　　　　B. B. KENDIG　　　　　2,007,110
MACHINE FOR LETTERING HAT BANDS AND THE LIKE
Filed Dec. 28, 1929　　　6 Sheets-Sheet 4
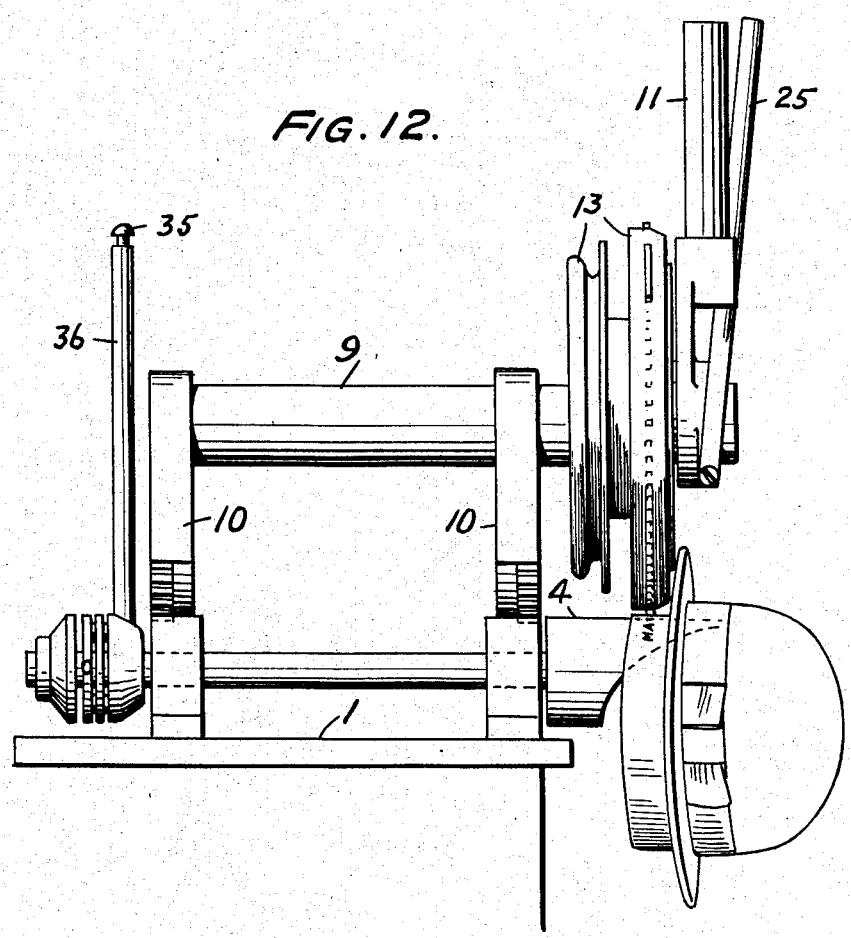
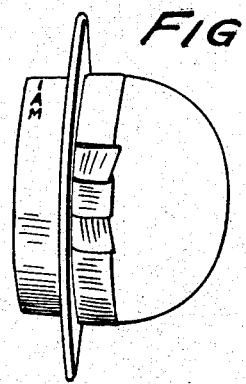
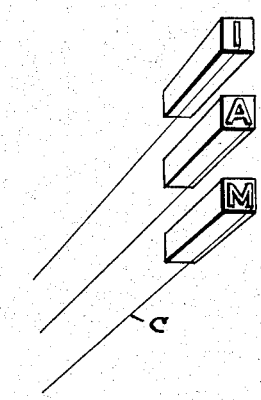
WITNESS:
INVENTOR
Benton B. Kendig
BY
Augustus B. Stoughton
ATTORNEY.

July 2, 1935.  B. B. KENDIG  2,007,110
MACHINE FOR LETTERING HAT BANDS AND THE LIKE
Filed Dec. 28, 1929    6 Sheets-Sheet 6

INVENTOR
Benton B. Kendig
BY
Augustus B. Stoughton.
ATTORNEY.

WITNESS:

Patented July 2, 1935

2,007,110

UNITED STATES PATENT OFFICE 2,007,110

MACHINE FOR LETTERING HAT BANDS AND THE LIKE

Benton B. Kendig, Staten Island, N. Y., assignor to Universal Publishing Syndicate, Philadelphia, Pa., a corporation of Pennsylvania Application December 28, 1929, Serial No. 417,046

8 Claims. (Cl. 197—6.4)

The principal object of the present invention is to provide a machine for lettering hat sweat bands and the like which shall be of simple construction and easy of operation and in which the type can be readily changed and in which the platen and article carried by it is automatically fed a distance equal to or appropriate for the width of the particular letter or character to be printed.

In a machine embodying features of the invention the feed of the platen is such that either the characters or the type, as desired, are properly spaced notwithstanding variations in their width and there are automatic means for correlating the distance that the platen is fed and the letter or character that is to be printed after such feed has occurred.

Other objects of the invention will appear from the following description at the end of which the invention will be claimed.

In the following description reference will be made to the accompanying drawings forming part hereof and in which Figure 1 is an elevational view, principally in central section, of a machine embodying features of the invention.

Fig. 2 is an end view of the same.

Fig. 3 is a sectional view taken on the line 3—3 of Fig. 1.

Fig. 4 is a sectional view taken generally on the line 4—4 of Fig. 1 with parts in different position.

Fig. 5 is a view partly in section illustrative of a detail and hereinafter referred to.

Fig. 6 is a view drawn to an enlarged scale and showing in section and elevation features of the invention and illustrating a half of the rotating parts.

Fig. 7 is a top or plan view of a portion of the type wheel shown in Fig. 6.

Fig. 8 is a plan view showing more particularly leaf feeding devices.

Fig. 9 is an elevation drawn to an enlarged scale, partly in section, showing the same.

Fig. 10 is a perspective view of one of the parts shown in Fig. 9.

Fig. 11 is a detail view of a part of a feeding clutch.

Fig. 12 is an elevational view illustrating a modification of the invention.

Fig. 13 is a view of a hat and band, the latter lettered by a machine embodying features of the invention.

Fig. 14 is a detail view illustrating a different arrangement of type.

Fig. 19 is a view similar to Fig. 6 and illustrating a modification.

Fig. 20 is a face view looking from the right towards the left hand portion of Fig. 19.

Figure 21:
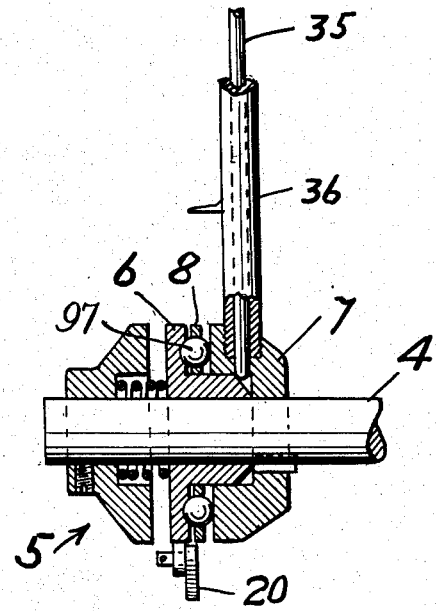
Fig. 21 is an elevational view partly in section illustrating a detail of construction.

Referring to the drawings and more particularly to Figs. 1 to 11, 1 indicates the base of the machine, and the base is provided with toothed racks 2 which are shown as equipped with tracks 3. There is a turnable platen 4 mounted on the base. The platen is provided with means for turning it about its center as an axis in the one direction of rotation, and for permitting of its being returned to the position from which it started. These means are shown as a ball clutch drive 5 of which 6 is the driving member and of which 7 is a driven member. The clutch that carries the balls is indicated at 8. As seen in Fig. 11, driving member 6 has indentations or grooves 96 therein which are narrower at one end than the other. The clutch balls 97 ride in the notches or grooves. When driving member 6 is rotated counter-clockwise as seen in Fig. 11, balls 97 ride up in the narrow part of groove 96 and clamp the driving member 6 and driven member 7 together thereby turning shaft 4 which is keyed to driven member 7. When it is desired to rotate shaft 4 and the platen mounted thereon without disturbing the position of driving member 6 push rod 35 is pushed inward as seen in Fig. 21, thus moving driving member 6 to the left along shaft 4 against the tension of the unnumbered spring and thereby permitting driven member 7 and consequently shaft 4 to be rotated without changing the position of driving member 6. 9 is a rod or shaft mounted on toothed rockers 10 adapted to roll on the racks 2 and tracks 3, and it is provided with an operating handle 11. There is a driving element 12 fast on the shaft 9 and as shown the handle 11 is connected with it. 13 is a type or character wheel turnable in respect to the driving element and shown as turnably mounted on the shaft 9. The type wheel is provided with oppositely disposed printing (or in the case of a stencil, cutting) and guide characters such, for example, as 14 and 15, Fig. 4, so that any character is necessarily brought into operative position by setting the corresponding guide character in respect to the driving element, or more accurately, in respect to the pointer 16 thereof. 17 is a lever for actuating the clutch driving means 5 of the platen. The lever 17 is mounted on a rod 18 ranging lengthwise of the frame and is turnable. By means of an arm 19 on the rod 18, and a link 20, Fig. 2, the driving element 6 of the platen clutch drive is operatively connected with the lever 17. 21 indicates a series of pins corresponding to the various type elements and carried by the type wheel and arranged eccentrically in respect to the center of the shaft 9, Fig. 4, and which, when projected into the path of the lever 17, or more accurately, the wall 22 of the notched part thereof, operate or are adapted to turn the lever 17 for different distances and then to clear it, so that the platen is turned different distances at various movements of the driving element 17. In further explanation it may be said that the center 18 about which the lever 17 turns, and the center 9 about which the type wheel turns, are spaced from each other, so that the arcs described by the part 22 of the lever and by the pins 21 intersect, and the radii of the pins in respect to the center 9 are not the same, from which it results that one of the pins 21 drives the lever 17 through an arc of one length and then clears it, and another pin drives the lever 17 through an arc of another length and then clears it. In consequence of this the platen is advanced in stages for different distances. The pins 21 are shown as of the spring retracted variety and as mounted in sockets provided in the type wheel. 23 is a master pin mounted in the driving element 12, and it is of the spring pressed variety and is normally withdrawn clear of the clutch pins 21. The master pin 23 is adapted to project any one of the clutch pins that has been turned into line with it. The heads 24 of the clutch pins 21 are large enough to allow of this notwithstanding that the pins 21 are eccentrically arranged. The handle 25, pivoted at 26 to the driving element 12, Fig. 3, is a means for projecting the master pin 23. The dash and dot line a, in Fig. 6 indicates the location of the handle 25.

For the application of gold or metal leaf, Fig. 8, there is provided a swinging arm 27 carrying a reel 28 and a guide 29 having an opening 30 therein through which the printing is done. There is on the platen a spring 31 that holds the leaf indicated by dotted line b, so that when the platen 4 is turned, the leaf is fed. The type are kept sufficiently warm by an electric heater 32, Fig. 6, supplied with current, for example, by the conductors 33 and contact rings and brushes 34.

The fine radial lines c, Fig. 4, show that the following edges of the type and the pins 21 which pertain to the type are diametrically opposite.

Figure 15:
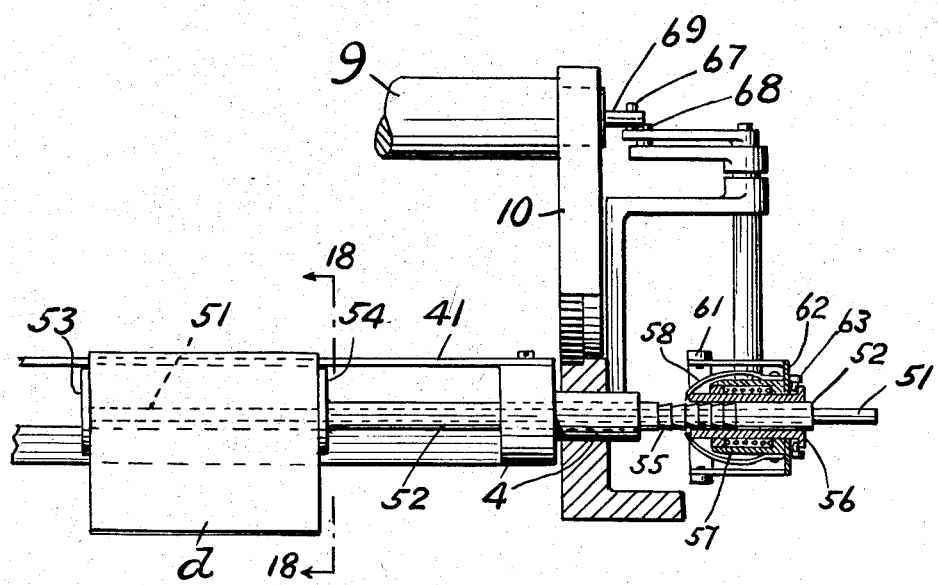
Fig. 15 is a view principally in elevation and partly in section illustrating means for vertically spacing the lettering.

Sometimes it is desirable to provide for feeding the book d along the bar 41, and referring to Figs. 15 to 18, and Fig. 1 a description will be given of one type of means for that purpose. Through the platen 4 and through one trunnion thereof extend a pair of sleeved rods 51 and 52 arranged for endwise movement. These rods are fitted with pushers 53 and 54 by means of which the book, or other object, is pushed along the rod 41, Fig. 18. The rod 51 may be hand operated, but the rod 52 is preferably automatically operated by the rocking frame which carries the character wheel. The rod 52 is provided with teeth 55, Fig. 15. The nested spools 56 and 57 are relatively endwise slidable and mounted for sliding on the rod 52. 58 are spring fingers fast on the spool 57 and tending to engage the teeth 55, unless restrained by the spool 56 as shown in Fig. 15. To feed the rod 52 towards the left in Fig. 15 the inner spool 56 is moved toward the right in respect to the outer spool 57 clearing the spring fingers 58 and then both spools and the rod 52 are moved towards the left pushing the object d in that direction. To push the spools 56 and 57 there is a spring retracted shipper rod 59 pivoted at 60, Fig. 16, and provided with a fork 61, engaging a plate 62 which operates upon the head of the outer spool 57; there is also another spring retracted shipper rod 63, pivoted intermediate of its ends on the rod 59, as at 64, and it engages an annular groove in the head of the inner spool 56. The shipper rods 63 and 59 are operated respectively by arms 65 and 66 upon sleeved vertically arranged turntable shafts having at their upper ends arms 67 and 68. The arm 67 is in range of the arm 68 and of a projection 69 on the rocker frame, Fig. 1. After the frame has been rocked to print, the projection 69 turns arm 67 releasing the spring fingers 58 by the withdrawal of the inner spool 56, and the arm 67 turns the arm 68, causing the spring fingers 58 to engage the teeth 55 and shift the rod 52.

The mode of operation may be described as follows and the description will be given in connection with printing the title or other matter on the back of a book d, although such use is descriptive, and the invention is applicable to classes of work too numerous to mention.

Figure 22:
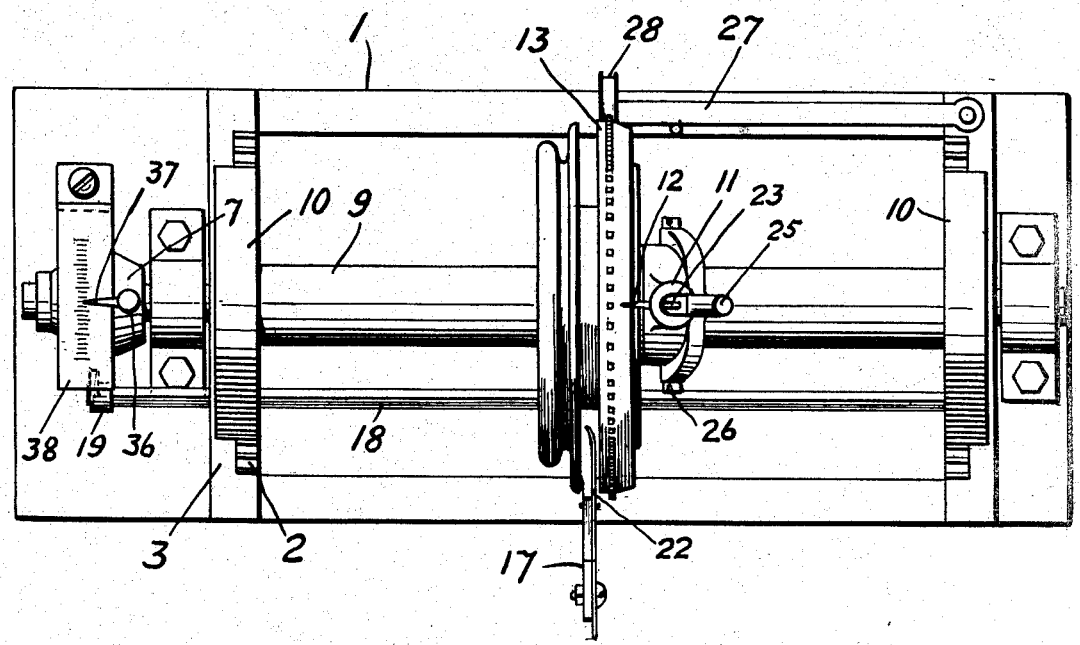
Fig. 22 is a top or plan view illustrating the machine.

The push rod 35 is pushed to free the platen driving clutch, and by means of the handle 36, the platen is turned counter-clockwise in Fig. 2 sufficiently far to provide for the proper spacing of a particular title on the back of a book. The pointer 37 and the scale 38, Figs. 2 and 22, are useful for this purpose. The type wheel with the parts in the position generally indicated in Fig. 4 is set or turned to bring the guide character 15, corresponding to the first letter or character to be printed, opposite the pointer 16. Then the handle 25 is pressed toward the handle 11 causing a pin corresponding to the letter selected to be projected into the path of the wall 22 of the lever 17. Then the rockers 10 are rolled on the frame by means of the handle 11 with the result that the lever 17 is turned for a distance appropriate for turning the platen 4 into proper position for receiving the print from the character 14. Before the printing occurs, the lever 17, when released, is retracted by a spring 40 to normal position but the platen remains in the position into which it has been turned. The described movements are repeated for additional letters until the title is completed. In the case of a book, it may be mounted on the platen by turning the bracket or arm 27 out of the way and by arranging the bar 41 through the space between the back of the leaves and the back of the cover, as indicated in Fig. 5, or the leaves may not be bound in the cover, as indicated in Fig. 4.

The construction and mode of operation of the modification shown in Figs. 12 to 14 are as above described except that the rockers are both arranged on the same side of the platen and printing mechanism, and except that the platen is adapted to receive a hat sweat band. In Fig. 12 the letters are arranged crosswise of the band and in Fig. 13 the letters are arranged lengthwise of the band. In Fig. 14 the fine lines c' have the same significance as the lines c in Fig. 4 but they lead from the end of the letter or character instead of from the following edge of the type.

The construction and mode of operation of the modification shown in Figs. 19 and 20 are as above described except as follows:

The pin 21ᵃ, pivoted to the lever 25, serves as a combined master and clutch pin. It is projectable and retractable in respect to the driving element 12ᵃ and its free end is afforded up and down motion by means of the slot 21ᵇ and spring centered movable box 21ᶜ. The holes 21ᵈ, through the character wheel 13ᵃ, through which the pin 21ᵃ passes, are provided with funnel shaped inlets disposed at different radiuses from the center of revolution of the part 13ᵃ, Fig. 20. In that figure the dotted line indicates that some part of the opening of the funnel shaped inlets is opposite the normal position of the pins, in fact the dotted line may be taken to indicate the normal position of the pin when centered by the spring pressed box 21ᶜ. The result is that the end of the pin will enter any opening that is placed opposite it.

Figures 16, 17:
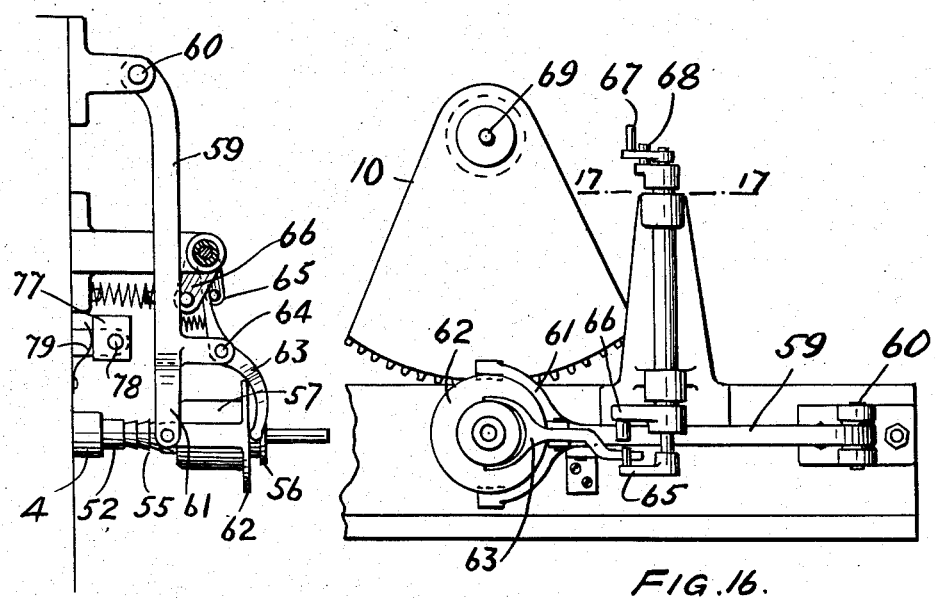
Fig. 16 is an end view of the same.
Fig. 17 is a sectional view on the line 17—17 of Fig. 16.
Figure 18:
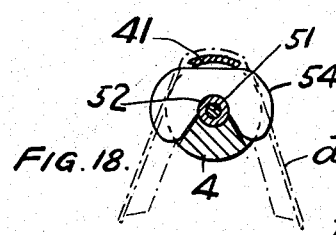
Fig. 18 is a section on line 18—18, Fig. 15.

Referring to Fig. 17 it may be remarked that 77 is a stop eccentrically pivoted and held when adjusted by the spring 79. The purpose of the stop is to limit movement of the element 59 and in that way limit the extent of sliding movement of book d.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. A machine of the type described comprising, in combination, a base provided with a toothed rack, a turnable platen mounted in the base and having means for turning it in one direction, a shaft, toothed rockers supporting said shaft and adapted to roll on the rack, a driving element fast on the shaft, a character wheel turnable in respect to the driving element, a lever turnably mounted about a center spaced from the center of the driving element, means adapted to actuate the turning means of the platen from said lever, a pin cooperating with the character wheel to lock it in different positions to the driving element, said pin being movable different distances from the center of the character wheel and adapted for projection to cooperate with said lever for moving the lever different distances and then releasing it, and means for actuating the pin.

2. In a machine of the type recited, a turnable platen, a mechanism for turning the platen in one direction and which includes a lever, a rocker frame including a character wheel, and a pin mechanism movable different distances from the center of the character wheel and adapted for projection into the path of the lever so that movement of the character wheel moves the lever different distances, whereby the extent of the feed of the platen is coordinated with the width of the character to be printed.

3. A machine of the type described comprising, in combination a base provided with a toothed rack, a turnable platen mounted in the base and having means for turning it in one direction, a shaft, toothed rockers supporting said shaft and adapted to roll on the rack, a driving element fast on the shaft, a character wheel turnable in respect to the driving element, a lever turnably mounted about a center spaced from the center of the driving element, means adapted to actuate the turning means of the platen from said lever, a pin cooperating with the character wheel to lock it in different positions to the driving element, said pin being movable different distances from the center of the character wheel and adapted for projection to cooperate with said lever for moving the lever different distances and then releasing it, means for actuating the pin, a stationary scale, and means for initially setting said platen relative to said scale to adjust the platen for the number of characters to be used.

4. In a machine of the type recited, the combination of, a settable wheel having type or characters thereon, means for affording the wheel a motion of translation, a platen, a lever turnable about a center spaced from the center of said wheel, means connecting said lever to said platen so that said lever moves said platen in one direction of rotation, and second means arranged to be operative at different distances from the center of said character wheel to engage said lever and to move it different distances depending upon the distance of the operative second means from the center of said wheel and to then release said lever.

5. In a machine of the type described, an actuating member, an element movable relative to said actuating member and having a plurality of type characters thereon, a platen mounted to receive the pressure of a selected one of said type characters, a lever connected to said platen to rotate said platen in one direction, and means operable to connect said actuating member to said element and to project from said element at different distances from the center of said element and to engage said lever and to move said lever different distances and to disengage said lever.

6. In a machine of the type recited, the combination of, a turnable platen, a settable character wheel, a support for said character wheel, means for actuating said platen and adapted to be selectively connected to said character wheel so that, upon movement of said character wheel and said support, said platen is moved a selected distance, and means actuated by movement of said support for moving work endwise of said platen.

7. In a machine of the type described, an actuating member, an element movable relative to said actuating member and having a plurality of type characters thereon, a platen mounted to receive the pressure of a selected one of said type characters, first means connected to said platen for actuating said platen in one direction, and second means for connecting said actuating member to said element, said second means being adjustable to operate said first means to actuate said platen a distance depending upon the width of the type character selected.

8. In a machine of the type described, an actuating member, an element movable relative to said actuating member and having a plurality of type characters thereon, a platen mounted to receive the pressure of a selected one of said type characters, first means connected to said platen for actuating said platen in one direction, second means for adjusting the position at which said first means becomes operative, and third means for connecting said actuating member to said element, said third means being adjustable to operate said first means to actuate said platen a distance depending upon the width of the type character selected.

BENTON B. KENDIG.